United States Patent [19]

Bierwirth et al.

[11] 4,146,520

[45] Mar. 27, 1979

[54] POLYVINYLCHLORIDE PLASTISOLS HAVING IMPROVED ADHESION

[75] Inventors: Egon Bierwirth, Orizaba, Mexico; Norbert Esper, Bergkamen, Fed. Rep. of Germany; Christian Burba, Ascheberg-Herbern, Fed. Rep. of Germany; Rolf Spickers, Kamen, Fed. Rep. of Germany

[73] Assignee: Schering Aktiengesellschaft, Berlin and Bergkamen, Fed. Rep. of Germany

[21] Appl. No.: 855,805

[22] Filed: Nov. 29, 1977

[30] Foreign Application Priority Data

Dec. 3, 1976 [DE] Fed. Rep. of Germany ....... 2654871

[51] Int. Cl.$^2$ .................. C08F 14/06; C09J 3/00; C09J 3/16
[52] U.S. Cl. .................. 260/23 XA; 156/333; 260/31.8 K; 260/31.8 B; 260/31.8 DA; 260/32.6 R
[58] Field of Search ....... 260/23 XA, 32.6 R, 31.8 K, 260/31.8 B, 31.8 DA; 156/333

[56] References Cited

U.S. PATENT DOCUMENTS

| | | | |
|---|---|---|---|
| 3,135,796 | 6/1964 | Layer et al. | 260/566 |
| 3,180,885 | 4/1965 | Nentwig et al. | 260/465 |
| 3,216,969 | 11/1965 | Cyba | 260/45.75 |
| 3,260,692 | 7/1966 | Magne et al. | 260/32.6 R |
| 3,324,158 | 6/1967 | Cyba et al. | 260/439 |
| 3,349,110 | 10/1967 | Cyba | 260/439 |
| 3,368,974 | 2/1968 | Sparks | 252/50 |
| 3,398,170 | 8/1968 | Cyba | 260/439 |
| 3,478,096 | 11/1969 | Cyba | 260/563 |
| 3,674,695 | 7/1972 | Wuerstlin et al. | 260/566 F |
| 3,742,033 | 6/1973 | Hajek et al. | 260/558 A |
| 3,785,855 | 1/1974 | Sausaman et al. | 260/89.7 R |
| 3,937,716 | 2/1976 | Lewis et al. | 260/486 R |

FOREIGN PATENT DOCUMENTS

| | | |
|---|---|---|
| 2123171 | 11/1974 | Fed. Rep. of Germany. |
| 2327958 | 1/1975 | Fed. Rep. of Germany. |
| 2402037 | 5/1975 | Fed. Rep. of Germany. |

OTHER PUBLICATIONS

*Deutsche Farben Zeitschrift*, 19th Edition, No. 3, pp. 93-106, 1965.

*Primary Examiner*—Ronald W. Griffin
*Attorney, Agent, or Firm*—Curtis, Morris & Safford

[57] ABSTRACT

What is disclosed is an adhesion improved plastisol composition adaptable to use as a coating material or adhesive and comprising a finely-divided vinyl chloride polymer together with a plasticizer and filler and an adhesion improver which is (1) a condensation product formed between a polymerized fatty acid mixture having a content, X, measured in weight percent of said mixture, of tripolymeric and higher polymeric fatty acids and excess polyalkylene polyamine; (2) a product formed by reacting said condensation product (1) with an aldehyde or ketone; or (3) an adduct formed between said condensation product (1) and an epoxy compound; said adhesion improver (1), (2), or (3) having a content, Y, of imidazoline groups, expressed as a percent by weight of condensation product (1), such that the values of both X and Y are at least 40, or if the value of either X or Y is below 40 then the other value is at least 40+Z, where Z is the difference between 40 and the smaller value.

5 Claims, No Drawings

POLYVINYLCHLORIDE PLASTISOLS HAVING IMPROVED ADHESION

The present invention relates to polyvinyl plastisols having improved adhesion at baking temperatures above 90° C. and to methods for adhering metallic materials and for preparing coatings on metallic materials with said plastisols. More in particular, said plastisols contain as an additive certain polyaminoamides containing imidazoline groups and prepared from polymerized fatty acids having an increased content of trimeric and higher polymeric fatty acids.

The resistance of polyvinyl chloride (PVC) or of its copolymers to rotting in the presence of aggressive media has been known in the art for a considerable time and is widely used for the protection of metallic surfaces against corrosion, for adhering thin sheet metal constructions, and for sealing welded seams, particularly in the automotive industry.

Such coatings are principally applied in the form of plasticized vinyl chloride polymers (plastisols) by printing, rolling, or spraying onto the surface of the material to be protected. In a widely used form, such coating masses (plastisols), comprise a polyvinyl chloride which can be made into a paste, the polymer being particularly characterized by a defined swelling capacity in plasticizers, and further comprise a plasticizer or plasticizer mixture, fillers, and stabilizers, as well as optional coloring pigments and auxiliary agents for improving the workability of polyvinyl chloride.

The formulation of plasticized polyvinyl chloride coating materials, their preparation, and their use is extensively described in Krekeler Wick, Kunststoff-Handbuch, Volume II, Part 1, pp. 396 et seq. (1963).

It is known that an essential criterion of the excellence of plastisols applied in this manner is their adhesion to the material to be coated. This is particularly true for coatings on metal parts. Loose adhesion of the protective layer raises the danger of penetration by aggressive media. In the case of coatings, for example, water can easily migrate under the coating and corrode the metal. This will be all the more possible the smaller the degree of adhesion of the protective film on the metal.

Thus, plastisols are required to permit the formation of the strongest bonds between the most different materials, in particular metallic materials.

For increasing the adhesion of these coatings, it has already been proposed to add adhesion-improving additives to the plasticized polyvinyl chloride, such additives being in the form of organic amine compounds or of esters of acrylic acid or methacrylic acid, or mixtures thereof. These two classes of materials nevertheless show serious disadvantages.

Organic compounds having free amino groups, such as aliphatic, cycloaliphatic, or aromatic amines, when mixed with polyvinylchloride to be sure often improve adhesion of a layer thereof to a metallic substrate. However, as a rule they show a high volatility and, as an undesired side effect, strongly decompose the polyvinyl chloride when the coating is baked. This is recognizable by the heavy formation of bubbles and by a brown coloration of the protective film. The most advantageous materials of this type are condensation products formed between polymeric fatty acids and polyamines, the so-called polyaminoamides. However, even these still show the undesired decomposition effect, even though it may be in a weakened form. In addition, when amine adhesion improvers are added, only a moderate internal strength can be achieved in a baked coating.

On the other hand, the esters of acrylic acid or methacrylic acid which are used as adhesion improvers are also unsatisfactory because the peroxides which are necessary for their cross-linking and, therewith, their efficacy, are difficult to handle in practice in view of an insufficient viscosity stability of the mixture. In addition, these additives mostly have a sufficient adhesion improving effect only at higher concentrations, so that their use is put into question from an economic viewpoint.

Thus, the problem to be solved according to the present invention was to find PVC plastisols which would not show the aforementioned disadvantages and which would have, at low temperatures, high adhesion when used as a protective coating or high bonding strength when used an an adhesive.

According to the present invention this problem has been solved by the discovery of plastisols, that is finely divided polyvinyl chloride homopolymers or vinyl chloride copolymers which contain conventional plasticizers, fillers, and additives, which additionally contain an adhesion improving condensation product prepared from (A) a polymerized fatty acid mixture having an increased content, X, in percent by weight, of tri-polymeric and higher polymeric fatty acids and from (B) an excess of polyalkylene polyamines, which condensation product has an imidazoline content, Y, in percent by weight. The additives are used in amounts from 0.5 to 5 percent by weight, based on the plasticized formulation, and the plastisols are baked at temperatures from 90° C. If one of these values of X or Y falls below a limit of 40 percent, the value of the other component, to achieve a clearly recognizable effect, is at least 40 + Z (wherein Z is the difference between the smaller value and 40), but the value preferably should be 40 + 2 Z.

The content of tri-polymeric and higher polymeric fatty acids (X) and the content of imidazoline (Y) are variable because of the complex composition of the components, primarily when X and Y have values near or below 40. The effects achievable according to the present invention to be sure are primarily dependent on the content of tripolymeric and higher polymeric acids and of the imidazoline content of the polyaminoamide-polyaminoimidazoline mixture. However, they are also influenced by the ratio of tri-functional to higher functional acids as well as by the kind and amount of the amine or amine mixture employed.

In general, it can be determined that: If the fatty acid contains at least 40 percent of tri-polymeric and higher polymeric fatty acids and if the imidazoline content of the condensation product is also 40 percent, the effect of the present invention will be surely achieved. The upper limit of the content of tri-functional and higher-functional fatty acids is 100 percent. The upper limit on the imidazoline content in the polyamino imidazoline is the practically-achievable value which is highest and closest to the calculated theoretically-possible content for a particular mixture.

If one of the values of X or Y falls beneath the 40 percent limit, then the value of the other component, for the achievement of a clearly recognizable effect, should be at least 40 + Z, where Z is the difference between the smaller value and 40, but should preferably be 40 + 2 Z.

The region in which both values are low is less preferred but nevertheless still possible within narrow limits. Thus, if one of the values is below 40 percent and the other is below 50 percent, the difference between the smaller value and 40 should not be larger than 10.

The advantages which can be achieved according to the invention are that the plastisol mixtures are storage stable practically without limit, that they show no color change or minimal color change after baking, that a clear increase in the adhesion can be obtained, and particularly that this increase is achievable with suitable formulations also at baking temperatures from 90° C., preferably from 110° C. As a rule, the most advantageous baking temperature for a particular PVC formulation—which is determined by the gelation temperature of the PVC formulation used—can be determined by a simple orientation test.

All materials conventional in this field are suitable as the materials to be coated or adhered, particularly metal and glass.

The adhesion improvers to be used for the preparation of plastisols according to the present invention are prepared from polycarboxylic acids and an excess of the amines. The condensation products suitably have an amine number between 200 and 600, preferably between 280 and 400.

The polycarboxylic acids can be prepared
(a) by the polymerization of unsaturated fatty acids having from 12 to 22 carbon atoms, preferably 18 carbon atoms, and removal of unreacted monomeric fatty acids, or
(b) according to a free radical mechanism in a directed reaction according to German Offenlegungeschrift No. 2,506,211.

The following are typical compositions for the polycarboxylic acids:

| Content | According to (a) | According to (b) |
|---|---|---|
| Monomeric fatty acid | 0 – 5 % | 1 % |
| Dimerized fatty acid | 10 – 25 % | 59 % |
| Trimerized and higher polymerized fatty acids | 90 – 70 % | 40 % |

Amines suitable for reaction with the polycarboxylic acids are those amines capable of imidazoline formation, for example polyalkylene polyamines such as diethylene triamine, triethylene tetramine, tetraethylene pentamine, pentaethylene hexamine, and 3-(2-aminoethyl)-aminopropylamine, which materials may optionally also contain amounts of other polyamines [cf. Ullman, "Enzyklopaedie der technischen Chemie," Volume 14, page 74 (1963)]. The amidation reaction takes place in a manner known per se at reaction temperatures between 210° C. and 260° C. optionally in vacuum. The reaction times are variable between wide limits depending on the imidazoline content desired. It is particularly advantageous that an imidazoline content greater than 40 percent be achieved.

Optionally, the polyaminoamide-polyaminoimidazoline mixtures described above, which are to be used according to the present invention, can be reacted with common ketones such as acetone, methyl-ethyl ketone, di-ethyl ketone, methyl-isobutyl ketone, cyclohexanone, cyclopentanone, di-isobutyl ketone, 3,3,5-trimethyl cyclohexanone, or methyl-phenyl ketone, or with aldehydes such as acetaldehyde, butyraldehyde, isobutyraldehyde, or benzaldehyde to form the corresponding Schiff bases or enamines.

The reaction takes place according to known methods and can be catalyzed with acids and carried out with or without a solvent. It is also possible to use the carbonyl compounds themselves—instead of a solvent—as entraining agents for the water of reaction which is to be separated.

Optionally, the free amino groups of the aforementioned polyaminoamides-polyaminoimidazolines can also be reacted with a deficiency of epoxy compounds to form adducts.

Suitable epoxy compounds are, for example, epoxides which are derived from polyvalent phenols, particularly bisphenols such as diphenylopropane, (bisphenol A), diphenylolmethane (bisphenol F), and phenol-formaldehyde-condensation products (Novolacs), as well as from aromatic di-carboxylic acids and poly-carboxylic acids such as the phthalic acids.

The adducts are obtained by reacting from 0.5 to 0.005 equivalent, particularly 0.2 to 0.03 equivalent, of epoxy oxygen of the polyepoxides with one equivalent of active hydrogen in the amino compounds.

The polyaminoamide-polyaminoimidazoline-mixtures, the epoxy adducts containing amino groups, as well as the Schiff bases and/or enamines which can be prepared from these two products, can also be mixed with one another and used as an adhesion improver.

A better understanding of the present invention and of its many advantages will be had by referring to the following specific examples, given by way of illustration. In the examples, the fatty acids have the following composition, determined for mixtures (1) and (3)-(5) from a gas-liquid-chromatogram.

| | COMPOSITION | |
|---|---|---|
| (1) | Monomeric fatty acid | 0% |
| | Dimeric fatty acid | 9% |
| | Trimeric fatty acid and higher polymeric fatty acid | 91% |
| (2) | Monomeric fatty acid | 1% |
| | Dimeric fatty acid | 59% |
| | Trimeric fatty acid and higher polymeric fatty acid | 40% |
| (3) | Monomeric fatty acid | 9% |
| | Dimeric fatty acid | 75% |
| | Trimeric fatty acid and higher polymeric fatty acid | 16% |
| (4) | Monomeric fatty acid | 1% |
| | Dimeric fatty acid | 25% |
| | Trimeric fatty acid and higher polymeric fatty acid | 74% |
| (5) | Monomeric fatty acid | 1% |
| | Dimeric fatty acid | 95% |
| | Trimeric fatty acid and higher polymeric fatty acid | 4% |

Preparation of Adhesion Improvers for Plastisols According to the Invention

Example A

Polyaminoamide from fatty acid and triethylene tetramine 200.2 g of polymeric fatty acid (1) [saponification number = 196] are combined with 102.2 g of triethylene tetramine and reacted for 8 hours at a maximum temperature of 240° C. 18 ml of water distill over. The product has the characteristics Amine number = 350/351
Imidazoline content = 48 percent A portion of the product is diluted to 80 percent with benzyl alcohol.

Example B

On reacting the remaining product with excess methyl-isobutyl ketone, the ketimine of the polyaminoamide is obtained, having the following characteristics:
Amine number = 271/273

Example C

Polyamide from polymeric fatty acid and triethylene tetramine 292 g of polymeric fatty acid (2) [saponification number = 192.2] are combined with 146 g of triethylene tetramine, heated to 220° C., and held at this temperature for three hours. 22 ml of water are distilled off. The product has the characteristics:
Acid number = 2.1
Amine number = 370/371
Imidazoline content = 33.2 percent

Example D

In a further three hours at a maximum temperature of 245° C., an additional 10 ml of water distill off. The product has the characteristics:
Acid number = 1.1
Amine number = 367/369
Imidazoline content = 67.2 percent

Example E

On reacting product D with excess methyl-isobutyl ketone, the ketimine of the polyaminoamide is obtained having the characteristics:
Amine number = 258/259

Example F

Polyamino amide from polymeric fatty acid and triethylene tetramine 2800 kg of dimeric fatty acid (3) [saponification number = 195], 2800 kg of trimeric fatty acid (4) [saponification number = 195, acid number = 180], and 2990 kg of triethylene tetramine (amine number = 1420) are charged into a reactor from weighing tanks. After about ten minutes, homogenization of the mixture, heating to 210° C. is begun and the mixture is left to react at this temperature until nearly the calculated amount of water has been distilled off. Subsequently, a vacuum of 100 mm Hg is applied at 210° C. in order to distill off amounts of water still wanting. Subsequently, the product is passed over a filter. The product has the characteristics:
Amine number = 380
Imidazoline content = 60.0 percent
Viscosity at 75° C. (Rotovisko) = 14 poises

Example G 100 g of polyaminoamide according to Example F are reacted to form an adduct by adding 25 g of benzyl alcohol and 5 g of a diglycidyl ether of bisphenol A having an epoxy value = 0.53 and stirring at 80° C. for six hours.

Example H

Polyaminoamide from polymeric fatty acid and tetraethylene pentamine

Proceeding as in Example F, 200 g of dimeric fatty acid (3) and 200 g of trimeric fatty acid (4) are reacted with 231.9 g of tetraethylene pentamine (amine number = 1325). A product having the following characteristics is obtained:
Amine number = 400
Imidazoline content = 65.5 percent
Viscosity at 75° C. (Rotovisko) = 57.8 poises.

Example I 100 g of polyaminoamide according to Example H are reacted to form an adduct by adding 25 g of benzyl alcohol and 5 g of a diglycidyl ether of bisphenol A having an epoxy value = 0.53 and stirring at 80° C. for six hours.

Example K

Polyaminoamide from polymeric fatty acid and triethylene tetramine

Proceeding as in Example F, 400 g of trimeric fatty acid (4) are reacted with 209.3 g of triethylene tetramine. A product having the following characteristics is obtained:
Amine number = 380
Imidazoline content = 57.3 percent
Viscosity at 75° C. (Rotovisko) = 46 poises.

Example L

Polyaminoamide from polymeric fatty acid and triethylene tetramine

Proceeding as in Example F, 200 g of dimeric fatty acid (5) and 200 g polymeric fatty acid (4) are reacted with 214.8 g of triethylene tetramine. A product with the following characteristics is obtained:
Amine number = 389
Imidazoline content = 62.7 percent
Viscosity at 75° C. (Rotovisko) = 15.6 poises

Example M 200 g of dimeric fatty acid (3), 200 g of trimeric fatty acid (4), and 209.2 g of triethylene tetramine are combined and reacted for two hours at 200° C., 32.5 g of water distill off. The product has the characteristics:
Amine number = 374
Imidazoline content = 26.8 percent

Example N 400 g of dimeric fatty acid (5) are combined with 214.8 g of triethylene tetramine and reacted for two hours at 220° C. 32.5 g of water distill off. The product has the characteristics:
Amine number = 392
Imidazoline content = 27.7 percent

Example O 320 g of dimeric fatty acid (3), 80 g of trimeric fatty acid (4), and 214.8 g of triethylene tetramine are combined and heated for two hours at 210° C. and finally reacted in vacuum. 42 g of water distill off. The product has the characteristics:
Amine number = 389
Imidazoline content = 62 percent

Example P 80 g of dimeric fatty acid (3), 320 g of trimeric fatty acid (4), and 214.8 g of triethylene tetramine are combined and reacted for two hours at 210° C. and finally in vacuum. 42 g of water distill off. The product has the characteristics:
Amine number = 389
Imidazoline content = 57 percent

Example Q 250 g of polymeric fatty acid (1) are combined with 134.4 g of triethylene tetramine and reacted for one hour at 210° C. 18 g of water distill off. The product has the characteristics:
Amine number = 395
Imidazoline content = 22 percent

Example R 250 g of polymeric fatty acid (1) are combined with 134.4 g of triethylene tetramine and reacted for one hour at 180° C. 15.5 g of water distill off. The product has the characteristics:
Amine number = 394
Imidazoline content = about 10 percent

Example S 400 g of polymeric fatty acid (3) are combined with 215 g of triethylene tetramine and reacted for 2.5 hours at 210° C. and finally in vacuum. 46 g of water distill off. The product has the characteristics:
Amine number = 400
Imidazoline content = about 80–82 percent

Example T 572 g of polymeric fatty acid (1) [saponification number = 196] and 240 g of 3-(2-aminoethyl)-aminopropylamine (tradename: N3-amine, amine number = 1400) are heated up to 210° C. and reacted for about 2 hours at this temperature, in vacuum toward the end.
The product has the characteristics:
Amine number = 289
Imidazoline content = 24 percent

Example U 572 g of polymeric fatty acid (1) [saponification number = 196] are reacted with 200 g of diethylene triamine as in Example T.
The product has the characteristics:
Amine number = 297
Imidazoline content = 39 percent

Example V

The imidazoline-containing polyaminoamide prepared according to Example A is refluxed with excess methyl-ethyl-ketone in a water separator until separation of water is concluded. The excess ketone is distilled off in vacuum and a product containing ketimine groups having an amine number = 284/287 is obtained.

Example W

The polyaminoamide of Example A is reacted with excess 3,5,5-trimethylcyclohexanone according to Example V to form a ketimine. A product having an amine number = 248/250 is obtained.

Example X 53 g of an epoxy resin comprising Bisphenol A and having an epoxy value = 0.25 are added to 100 g of the polyaminoamide according to Example F and reacted at 80° C. for 6 hours with stirring.

Example Y 26 g of a Novolak diglycidylether having an epoxy value = 0.56 are added to 100 g of the polyaminoamide according to Example K and are reacted with stirring at 80° C.

Example Z 22 g of phthalic acid diglycidyl ester having an epoxy value = 0.6 are added to 100 g of the polyaminoamide according to Example F and are reacted at 80° C. with stirring.

PREPARATION OF PLASTISOLS

Two percent, by weight of the total mixture, of the aforementioned adhesion improvers A-S, or mixtures of these products with one another according to choice, is added to a plastisol comprising 45 parts by weight of polyvinyl chloride capable of being made into a paste and having a K-value = 70, 55 parts by weight of phthalic acid di-(2-ethylhexyl)-ester, 100 parts by weight of a filler mixture of 50% chalk and 50% barium sulfate, and 1.5 parts by weight of di-iso-butyl-tinisooctylthioglycolic acid ester.

The adhesion improvers can of course be added to other conventional plastisol formulations different from that given above in order to obtain the self-adhering plastisols according to the present invention.

The bonding strengths which can be achieved for adhesive joints using the plastisols according to the present invention were determined according to DIN 53283 by measurement of the tensile shear strength. For this purpose, sheet metal bonding plates (type 901, commercially available from Metallgesellschaft, Frankfurt, Germany) were used as bonding pieces. The size of the pieces to be joined: 2.5 cm × 10.5 cm × 0.15 cm (breadth × length × thickness).

The layer thickness of the plastisols in the adhesive joint was adjusted to 2 mm by means of spacers.

The parts to be joined were heated at 160° C. for 30 minutes and bonded to each other with an overlap of 15 mm in this fashion. The following tensile shear strengths were measured;

| Examples | Tensile Shear Strength (kg/cm$^2$) | Examples | Tensile Shear Strength (kg/cm$^2$) |
|---|---|---|---|
| A | 14.5 | K | 14.5 |
| B | 26.8 | L | 15.1 |
| C** | 7.3 | M** | 4.3 |
| D | 13.6 | N** | 3.7 |
| E | 24.0 | O | 8.2 |
| F | 11.0 | P | 13.6 |
| G | 17.0 | Q | 19.3 |
| H | 19.9 | R | 16.0 |
| I | 24.5 | S | 11.4 |
| Comparison Example* = 5.0 kg/cm$^2$ | | | |

*Polyaminoamide comprising dimeric fatty acid (3) and triethylene tetramine (amine number = 375, imidazoline content = 55 percent, trimer content = 15 percent).
**These compositions fall outside the scope of the invention and are presented for purposes of comparison.

What is claimed is:
1. An adhesion improved plastisol composition adaptable to use as a coating material or adhesive and com- prising a finely-divided vinyl chloride polymer together with a plasticizer and filler and from 0.5 to 5 percent, by weight of said plastisol composition, of an adhesion improver which is (1) a condensation product formed between
 (a) a polymerized fatty acid mixture having a content, X, measured in weight percent of said mixture, of tripolymeric and higher polymeric fatty acids, and
 (b) excess polyalkylene polyamine;
(2) a product formed by reacting said condensation product (1) with an aldehyde or ketone; or
(3) an adduct formed between said condensation product (1) and a deficiency of an epoxy compound; said adhesion improver (1), (2), or (3) having a content, Y, of imidazoline groups, expressed as a percent by weight of condensation product (1), such that the values of both X and Y are at least 40, or if the value of either X or Y is below 40 then the other value is at least 40 + Z, where Z is the difference between 40 and the smaller value.

2. A plastisol as in claim 1 wherein said adhesion improver is a condensation product (1).

3. A plastisol as in claim 1 wherein said adhesion improver is a reaction product (2).

4. A plastisol as in claim 1 wherein said adhesion improver is an adduct (3).

5. The method of forming a coating or adhesive bond of a vinyl chloride polymer on a substrate which comprises applying an improved plastisol as in claim 1 to said substrate and then baking said substrate having said plastisol thereon at a temperature of at least about 90° C., said substrate not melting at the baking temperature.

* * * * *